(12) United States Patent
Pora

(10) Patent No.: US 11,691,751 B2
(45) Date of Patent: Jul. 4, 2023

(54) ACCUMULATOR ON A FUEL LINE OF AN AIRCRAFT

(71) Applicant: SAFRAN AIRCRAFT ENGINES, Paris (FR)

(72) Inventor: Loic Pora, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1057 days.

(21) Appl. No.: 16/469,019

(22) PCT Filed: Dec. 15, 2017

(86) PCT No.: PCT/FR2017/053593
§ 371 (c)(1),
(2) Date: Jun. 12, 2019

(87) PCT Pub. No.: WO2018/115651
PCT Pub. Date: Jun. 28, 2018

(65) Prior Publication Data
US 2019/0367176 A1  Dec. 5, 2019

(30) Foreign Application Priority Data

Dec. 19, 2016 (FR) ...................... 1662754

(51) Int. Cl.
*B64D 37/00* (2006.01)
*F02C 7/22* (2006.01)
(Continued)

(52) U.S. Cl.
CPC ............ *B64D 37/005* (2013.01); *F02C 7/222* (2013.01); *F16L 55/07* (2013.01);
(Continued)

(58) Field of Classification Search
CPC ........ B64D 37/005; F16L 55/07; F15B 1/021; F15B 2201/3153; F15B 2201/405
(Continued)

(56) References Cited

U.S. PATENT DOCUMENTS 2,986,881 A    6/1961  Moore
3,063,470 A *  11/1962 Forster .................. F16L 55/054
                                                              138/30
(Continued)

FOREIGN PATENT DOCUMENTS

DE  20 2011 002 772 U1  8/2011
EP       2 565 412 A1   3/2013
GB       2 228 771 A    9/1990

OTHER PUBLICATIONS

International Search Report dated Mar. 2, 2018 in PCT/FR2017/053593 filed Dec. 15, 2017.
(Continued)

*Primary Examiner* — James F Hook
(74) *Attorney, Agent, or Firm* — Oblon, McClelland, Maier & Neustadt, L.L.P.

(57) ABSTRACT

An accumulator designed to damp the pressure waves of the hydraulic shocks originating in a downstream section of a duct is arranged inside the duct, with the opening of the accumulator pointing downstream. This results in excellent absorption of the pressure wave and protection of the circuit from possible accumulations of air, water or ice, there being no areas where the flow stagnates. Immersing the accumulator in the flow also makes it possible to ensure that the equipment is protected in the event of a fire.

10 Claims, 2 Drawing Sheets

(51) Int. Cl.
*F16L 55/07* (2006.01)
*F15B 1/02* (2006.01)

(52) U.S. Cl.
CPC .......... *F05D 2260/96* (2013.01); *F15B 1/021* (2013.01); *F15B 2201/3153* (2013.01); *F15B 2201/405* (2013.01)

(58) Field of Classification Search
USPC .................................. 244/135 R; 138/30, 26
See application file for complete search history.

(56) References Cited

U.S. PATENT DOCUMENTS

| | | | | |
|---|---|---|---|---|
| 3,165,166 | A | * | 1/1965 | Hall ........................ F15B 21/00 138/30 |
| 3,473,565 | A | * | 10/1969 | Blendermann ....... F16L 55/054 137/593 |
| 3,536,102 | A | | 10/1970 | Allewitz et al. |
| 3,625,242 | A | * | 12/1971 | Ostwald ................. F16L 55/04 138/30 |
| 3,766,992 | A | * | 10/1973 | Tiraspolsky .............. F15B 1/16 175/25 |
| 3,878,867 | A | * | 4/1975 | Dirks .................... F16L 55/054 138/30 |
| 3,891,151 | A | * | 6/1975 | Showalter .............. F02M 45/04 239/533.5 |
| 4,032,265 | A | * | 6/1977 | Miller ................. F04B 11/0016 137/565.34 |
| 4,432,393 | A | | 2/1984 | Mills |
| 4,497,388 | A | * | 2/1985 | Dexter .................. F16L 55/053 181/269 |
| 4,759,387 | A | * | 7/1988 | Arendt .................. F16L 55/054 138/30 |
| 5,228,844 | A | | 7/1993 | Klopfer et al. |
| 6,131,613 | A | * | 10/2000 | Jenski, Jr. ............. F16L 55/054 138/30 |
| 6,164,336 | A | * | 12/2000 | Pasquet .................... B60T 8/409 138/30 |
| 6,267,104 | B1 | | 7/2001 | Monnier |
| 6,651,698 | B1 | * | 11/2003 | Wilkes .................. F16K 47/023 138/30 |
| 6,948,479 | B1 | * | 9/2005 | Raney ..................... F16L 11/26 123/456 |
| 8,915,073 | B1 | | 12/2014 | Theobald |
| 9,657,750 | B1 | | 5/2017 | Theobald |
| 2005/0263198 | A1 | * | 12/2005 | Kamada ............. F02M 37/0041 138/30 |
| 2008/0142105 | A1 | * | 6/2008 | Zdroik ................ F02M 55/025 138/30 |
| 2009/0133768 | A1 | | 5/2009 | Miyake et al. |
| 2010/0307146 | A1 | * | 12/2010 | Lehnert ................... F15B 1/021 60/414 |
| 2012/0000560 | A1 | | 1/2012 | Stroganov et al. |
| 2012/0042644 | A1 | | 2/2012 | Noack |
| 2014/0196808 | A1 | | 7/2014 | Besnard |

OTHER PUBLICATIONS

French Preliminary Search Report dated Jul. 26, 2017 in Patent Application No. 1662754 filed Dec. 19, 2016.

* cited by examiner

ACCUMULATOR ON A FUEL LINE OF AN AIRCRAFT

The subject matter of the invention is an accumulator on a fuel line of an aircraft.

DESCRIPTION OF THE RELATED ART

In case of detecting an overspeed in the aircraft engine, the control system quickly cuts off the flow rate of fuel injected. Thereby, there can be a water hammer, likely to damage the fuel supply system upstream of the engine. That is why a hydraulic accumulator is often disposed on the piping, in order to filter the pressure pick associated with this water hammer.

FIG. 1 schematically represents an existing configuration in which an accumulator 1 is connected to a piping 2 between a fuel tank 3 in the upstream and a downstream portion of the fuel system, leading to injectors 4 belonging to the engine and comprising in particular a pumping unit 5 immediately downstream of the accumulator 1, a dosing unit 6 downstream of the previous one, and a flow control unit 7 associated with the pumping unit 5.

As is more precisely represented in FIG. 2, the accumulator 1 is usually connected to a transverse tap 8 of the piping 2 by a branching piping 9 perpendicular to the fuel flow piping 2, and the accumulator 1 is thus located at some distance from the same. It typically includes an outer wall 10 in which a bellows seal structure 11 and a piston separates a gaseous volume 12 from a liquid volume 13, the latter communicating with the fuel flow through a port 14 of the outer wall 10 and the branching piping 9. When a water hammer occurs and a pressure wave appears in the fuel, the bellows 11 contracts and the liquid volume 13 increases to absorb the pressure rise.

Such arrangements of accumulator have various drawbacks. When the supply system is dismounted, the accumulator 1 is completely emptied of its liquid and has then to be reactivated, by actuating a purge device 15 which discharges air thereby occupying the liquid volume 13 as well as the supply piping 9. Another drawback is that the accumulator 1 is in a dead zone for the flow, where water can thus build up and possibly freeze with various possible damages (flow disturbance, corrosion or bacteria proliferation). The accumulator 1 should generally be attached to adjacent structures of the aircraft by supports 16 which thus make its implementation more complex. In case of fire, the static liquid content of the accumulator 1 is directly exposed to the flame temperature and is thus likely to be excessively heated and to vaporise, by breaking flow continuity. Finally, the absorption of pressure picks produced by water hammers is not ideal, because it is performed by a fluid expansion through the branching piping 9 perpendicular to the main piping 2, and which thus implies significant head losses.

And other designs of facilities for an accumulator on a fluid circulation line are set out in GB-2 228 771-A, U.S. Pat. No. 8,915,073-B1, U.S. Pat. No. 3,536,102-A and DE-20 2011 002772-U1: the accumulator is coaxial with the circulation line and surrounds it. This design does not avoid all the drawbacks mentioned, since the accumulator remains exposed to accidental rises in the external temperature, poorly absorbs the pressure picks of the water hammers, and the liquid chamber of the accumulator, which is still in a dead zone for the flow when it exists, retains too readily impurities (air, water, solid particles) which can enter therein.

BRIEF SUMMARY OF THE INVENTION

The object of the invention is thus to achieve an improved arrangement of a hydraulic accumulator on a fuel supply system of an aircraft engine.

Thereby, a general aspect of the invention is an aircraft fuel system, comprising a piping extending between a fuel tank and an engine, and a hydraulic accumulator opening into the piping, characterised in that the accumulator is surrounded by the piping. And the accumulator includes a filtering outer wall, disposed coaxial with the piping; and a port of the filtering outer wall, through which the accumulator communicates with the inside of the piping, is directed to the engine.

By disposing the accumulator in the piping, air and water accumulations are avoided, which are dissipated when the fuel flow is resumed; the exposure of the accumulator to accidental high temperatures is strongly decreased, since it is dipped into the fuel, being normally fresh, coming from the tank and which is renewed by virtue of the flow; therefore, it becomes easy to arrange the accumulator so as to produce a better absorption of the pressure picks of water hammers, since the pressure picks lifting in the piping are thus directly sent into the accumulator, without imposing a direction change, and thus without a significant head loss to the wave; and discharging the impurities possibly existing in the liquid chamber of the accumulator is readily performed by the stream that can be established through it, from the filtering wall to the port, in parallel to the main stream which bypasses the accumulator.

Both latter advantages are mainly due to the favourable position of the accumulator port, coaxial with the piping, and to its orientation, directed to downstream of the piping, and in the axis thereof immediately downstream of the accumulator.

A proper flow is achieved if the accumulator extends at a centre position of the piping, and is supported by the piping by means of a support which connects them: the flow is thereby evenly distributed about the accumulator.

A more moderate head loss in the flow can be expected if the support is therefore a perforated cylindrical partition wall, coaxial with the wall and with the piping.

In a typical configuration, the accumulator is located in an enlargement of the piping, connected to an upstream segment and a downstream segment with a smaller cross-section, the enlargement, the upstream segment and the downstream segment being coaxial and extending to each other (curvilinear or in a straight line).

In a preferred embodiment, a liquid chamber present in the accumulator communicates with the external volume, being the place of the flow, through the filtering outer wall of the accumulator and through an aperture provided with a filter, to further prevent solid impurities from appearing or gas bubbles from being permanently present.

BRIEF DESCRIPTION OF THE SEVERAL VIEWS OF THE DRAWINGS

These and other aspects, characteristics and advantages of the invention will now be described by means of the following figures, appended by way of purely illustrating purposes, which represent a detailed implementation.

DETAILED DESCRIPTION OF THE INVENTION

Figure 1:
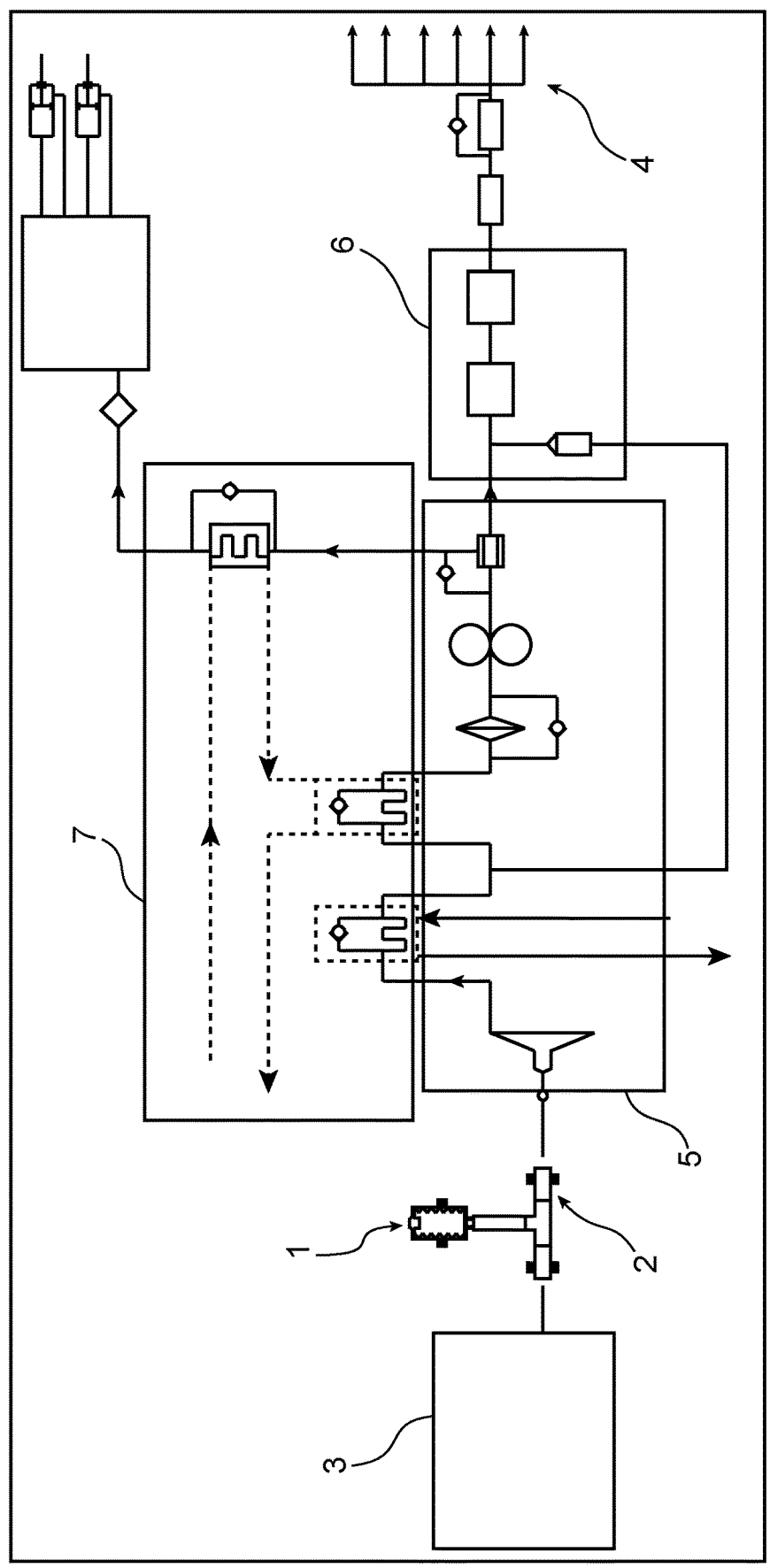
FIG. 1, already described, is a schematic representation of an aircraft fuel system.
Figure 2:
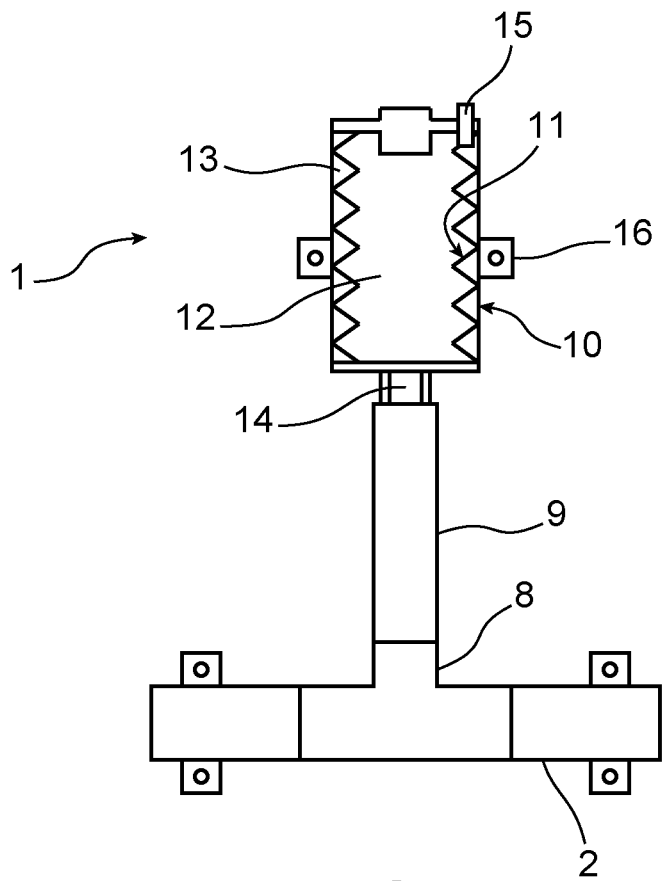
FIG. 2 illustrates a typical and known configuration of an accumulator.
Figure 3:
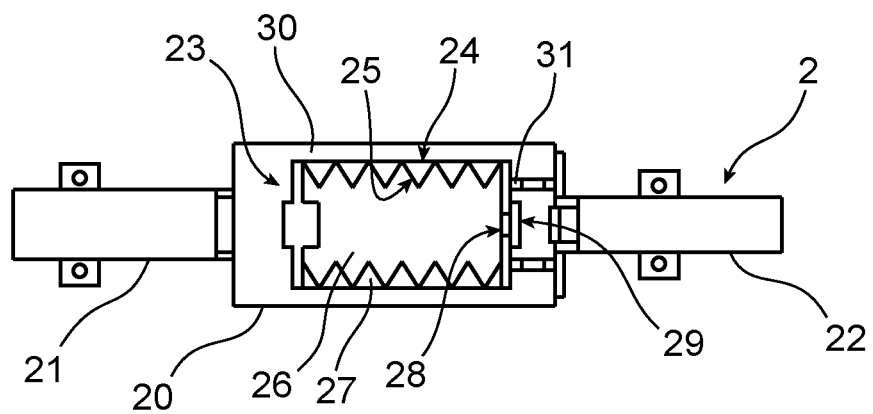
FIG. 3 illustrates a modified configuration according to the invention.

FIG. 3 is now commented.

The piping 2 now comprises a section enlargement 20 between an upstream segment 21 and a downstream segment 22, which have the normal, smaller cross-section of the piping 2. The enlargement 20, the upstream segment 21 and the downstream segment 22 are extending to each other and coaxial on a same straight line. The accumulator 23 of the invention is placed at the same place as the known accumulator 1 on the piping 2; it is similar in some aspects to the known accumulator 1, and includes in particular a cylindrical filtering outer wall 24, a piston bellows 25 (or, more generally, a deformable continuous wall) fully separating a gaseous volume 26 from a liquid volume 27 and a port 28 communicating the liquid volume 27 with the outside of the accumulator 23. The accumulator 23 can be free of a purge device, the port 28 is covered with a filter such as a strainer 29, and thus the orientation and disposition of the accumulator 23 are different, since the accumulator 23 is disposed inside and in the centre of the enlargement 20 of the piping 2, with the cylindrical outer wall 24 coaxial with the piping 2 and the enlargement 20, therefore leaving an annular clearance 30 with the same. A support 31 connects the accumulator 23 to the wall of the enlargement 20 and consists of a cylindrical perforated partition wall surrounding the port 28 coaxial with the outer wall 24 and with the piping 2.

The bellows 25 is a reliable mechanism. The filtering strainer 29 stops impurities which could enter the accumulator 23, but is fluid permeable, without a significant head loss.

The fuel flow from the upstream segment 21 bypasses the accumulator 23 through the annular clearance 30 before joining the downstream segment 22. It is expected that a moderate head loss could be obtained, since flow inflections are not much important. There are no stagnant zones where moisture and air would be likely to accumulate. In the case where the piping 2 is emptied and then the supply is resumed, the renewed fuel fills itself the liquid volume 27, by flushing air.

The filtering self-washable outer wall 24 enables the fluid included between the bellows 25 and the outer wall 24 to enter or be discharged. It ensures with the strainer 29 that no pollution can be blocked between the segments of the bellows 25, which could cause a risk of piercing the bellows 25. A circulation through the liquid volume 27 can be readily established from the filtering outer wall 24 to the port 28, since it is approximately parallel to the main flow; the liquid volume 27 cannot be considered as a dead volume for the flow.

And when a water hammer occurs, the pressure wave from the downstream segment 22 is immediately projected inside the accumulator 23, the port 28 being in front of the downstream segment 22, which ensures a proper overpressure absorption. No significant head loss is indeed produced, according to the invention, on the path of this pressure wave leading to the accumulator 23.

The outer wall 24 is advantageously of the self-washable type, in order to sweep the liquid volume 27.

The surfaces of the piping 2 and of the accumulator 23 could be modified to reduce if needed the head loss by mitigating the abrupt cross-section variations and flow direction.

If, nonetheless, moisture would build up in the enlargement 20 and would freeze at a temperature which would impose it, the port 28 should remain unobstructed, since the flow passes in front of it before moving farther, which maintains a flow circulation in front of it.

The invention can be designed with kinds of hydraulic accumulators other than hydropneumatic accumulators with bellows and piston.

The invention claimed is:

1. An aircraft fuel system comprising:
a piping extending between a fuel tank and an engine, and
a hydraulic accumulator opening into the piping,
wherein the accumulator is surrounded by the piping, the accumulator includes a filtering outer wall defining an annular clearance with the piping in which fuel flows, the filtering outer wall and the piping are coaxial, and a port of the accumulator is directed to the engine,
wherein the accumulator extends at a center position of the piping, and is supported by the piping with a support which connects the accumulator and the piping, and
wherein the support is a perforated cylindrical partition wall coaxial to the filtering outer wall and to the piping.

2. The aircraft fuel system according to claim 1, wherein the accumulator is located in an enlargement of the piping, connected to an upstream segment and a downstream segment with a smaller cross-section, the enlargement, the upstream segment and the downstream segment being coaxial and extending to each other.

3. The aircraft fuel system according to claim 1, wherein a liquid chamber present in the accumulator is separated by an outer volume of the accumulator by a filter and the filtering outer wall of the accumulator.

4. The aircraft fuel system according to claim 1, wherein the accumulator is a hydropneumatic accumulator.

5. The aircraft fuel system according to claim 4, wherein the hydropneumatic accumulator is with bellows.

6. An aircraft fuel system, comprising:
a piping extending between a fuel tank and an engine, and
a hydraulic accumulator opening into the piping,
wherein the accumulator is surrounded by the piping, the accumulator includes a filtering outer wall defining an annular clearance with the piping in which fuel flows, the outer wall and the piping are coaxial, and a port of the accumulator is directed to the engine, the hydraulic accumulator comprising a central gaseous volume that is separated from fuel flow by a deformable continuous wall,
wherein the accumulator extends at a center position of the piping, and is supported by the piping by a support which connects the accumulator and the piping, and
wherein the support is a perforated cylindrical partition wall coaxial to the filtering outer wall and to the piping.

7. The aircraft fuel system according to claim 6, wherein the accumulator is located in an enlargement of the piping, connected to an upstream segment and a downstream segment with a smaller cross-section, the enlargement, the upstream segment and the downstream segment being coaxial and extending to each other.

8. The aircraft fuel system according to claim 6, wherein a liquid chamber present in the accumulator is separated by an outer volume of the accumulator by a filter and the filtering outer wall of the accumulator.

9. The aircraft fuel system according to claim 6, wherein the accumulator is a hydropneumatic accumulator.

10. The aircraft fuel system according to claim 9, wherein the hydropneumatic accumulator is with bellows.

* * * * *